United States Patent
Hawkins et al.

(10) Patent No.: US 10,360,084 B1
(45) Date of Patent: *Jul. 23, 2019

(54) SYSTEM AND METHODS FOR LOGGING AND SEARCHING HISTORY EVENTS SUCH AS AIRLINE FLIGHT OR CREW HISTORY

(71) Applicant: AMERICAN AIRLINES, INC., Fort Worth, TX (US)

(72) Inventors: Mark Alan Hawkins, Euless, TX (US); Andrea Denise Wagner, Crestwood, MO (US); Cary Andreas Castle, Dallas, TX (US)

(73) Assignee: AMERICAN AIRLINES, INC., Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/130,553

(22) Filed: Sep. 13, 2018

Related U.S. Application Data

(63) Continuation of application No. 14/527,420, filed on Oct. 29, 2014, now Pat. No. 10,078,539.

(60) Provisional application No. 61/897,530, filed on Oct. 30, 2013.

(51) Int. Cl.
*G06F 9/54* (2006.01)
*G06F 16/248* (2019.01)

(52) U.S. Cl.
CPC .............. *G06F 9/542* (2013.01); *G06F 9/546* (2013.01); *G06F 16/248* (2019.01)

(58) Field of Classification Search
CPC ......... G06F 9/542; G06F 16/248; G06F 9/546
See application file for complete search history.

(56) References Cited

U.S. PATENT DOCUMENTS

| | | | |
|---|---|---|---|
| 5,390,314 A | 2/1995 | Swanson | |
| 5,574,934 A | 11/1996 | Mirashrafi et al. | |
| 5,652,759 A | 7/1997 | Stringfellow, Jr. | |
| 6,122,642 A * | 9/2000 | Mehovic | G06F 17/30569 700/216 |
| 6,707,472 B1 | 3/2004 | Grauman | |

(Continued)

OTHER PUBLICATIONS

Office Action in U.S. Appl. No. 14/527,420 dated Dec. 19, 2016, 20 pgs.

(Continued)

*Primary Examiner* — S. Sough
*Assistant Examiner* — Kimberly L Jordan
(74) *Attorney, Agent, or Firm* — Haynes and Boone, LLP

(57) ABSTRACT

A system and method according to which history events, such as airline flight or crew history events, are logged and searched. In one embodiment, sequenced information is obtained from one or more applications. In one embodiment, a user can input a single query and obtain sequenced information from new and legacy applications using the single query. In some embodiments, audit trail-like tracking of changes made to airline information is provided. In one embodiment, the system includes: a message handling system adapted to transform an event message; a message processor adapted to receive the event message and parse the event message; a database to which history data of the event message is persisted; and a query processor adapted to read airline flight or crew history event data in response to a query request, the airline flight or crew history event data comprising the history data.

12 Claims, 13 Drawing Sheets

(56) References Cited

U.S. PATENT DOCUMENTS

| | | | |
|---|---|---|---|
| 7,788,722 B1* | 8/2010 | Njemanze | H04L 63/20 726/22 |
| 8,332,473 B1 | 12/2012 | Fouts et al. | |
| 2002/0133566 A1 | 9/2002 | Teeple | |
| 2002/0198747 A1 | 12/2002 | Boyer et al. | |
| 2003/0115272 A1 | 6/2003 | Muttitt et al. | |
| 2003/0140131 A1 | 7/2003 | Chandrashekhar et al. | |
| 2003/0179228 A1* | 9/2003 | Schreiber | G06F 17/30557 715/738 |
| 2005/0005116 A1 | 1/2005 | Kasi et al. | |
| 2005/0010644 A1 | 1/2005 | Brown et al. | |
| 2005/0038863 A1 | 2/2005 | Onyon et al. | |
| 2005/0246193 A1 | 11/2005 | Roever et al. | |
| 2006/0112139 A1 | 5/2006 | Maple et al. | |
| 2008/0184270 A1 | 7/2008 | Cole et al. | |
| 2009/0233622 A1 | 9/2009 | Johnson | |

OTHER PUBLICATIONS

Final Office Action in U.S. Appl. No. 14/527,420 dated Jun. 16, 2017, 14 pgs.

Advisory Action in U.S. Appl. No. 14/527,420 dated Sep. 21, 2017, 5 pgs.

Office Action in U.S. Appl. No. 14/527,420 dated Oct. 5, 2017, 16 pgs.

Notice of Allowance in U.S. Appl. No. 14/527,420 dated Mar. 23, 2018, 8 pgs.

* cited by examiner

SYSTEM AND METHODS FOR LOGGING AND SEARCHING HISTORY EVENTS SUCH AS AIRLINE FLIGHT OR CREW HISTORY

CROSS-REFERENCE TO RELATED APPLICATIONS

This application is a continuation of U.S. application Ser. No. 14/527,420, filed Oct. 29, 2014, which claims the benefit of the filing date of, and priority to, U.S. Application No. 61/897,530, filed Oct. 30, 2013, the entire disclosures of which are hereby incorporated herein by reference.

The present disclosure is related to U.S. application Ser. No. 11/119,787, filed May 2, 2005, which issued on Dec. 11, 2012 as U.S. Pat. No. 8,332,473 to Fouts et al., the entire disclosures of which are hereby incorporated herein by reference.

BACKGROUND

In some systems, such as a flight operation system (FOS), the FOS has limited search, sort, and filter capabilities. Moreover, as applications migrate out of the FOS to individual platforms, information used to answer an operational question has to be assembled from many fragments, resulting in a laborious and time-consuming process.

In some systems, the flight/crew history functionality resides in legacy Transaction Processing Facility (TPF) mainframe environment(s). Every change event to a FOS flight or crew record is logged chronologically to the flight leg history or crew history record respectively. The change event can be generated by any of the multiple tightly coupled applications residing in the FOS. As these applications migrate out of the FOS, the user will be required to access multiple systems to view flight/crew historical events/history records. Also, the historical events/history records may be available in individual systems in different formats.

In some industries, such as the airline industry, airline employees access historical events, such as flight and crew history. They often query flight history to retrieve information about diversions, delays, flight plans, weather briefings, and cancelations. At airports, flight and crew history may be used to resolve gate, aircraft, fuel, and crew conflicts. At an operations center, history may be used to determine the sequence of historical events resulting in a weight-restricted flight, or to investigate an aircraft incident. However, sorting through different history events may be difficult if there are a multitude of history events for a single flight and those events are not time-sequenced. This difficulty increases when applications have migrated out of FOS onto individual platforms. History events are sequenced for a single flight only by application, but not across all applications, resulting in a more cumbersome process to use history as an operational tool.

Therefore, what is needed is a system, method, or apparatus that addresses one or more of the foregoing issues, and/or one or more other issues.

DETAILED DESCRIPTION

Figure 1:
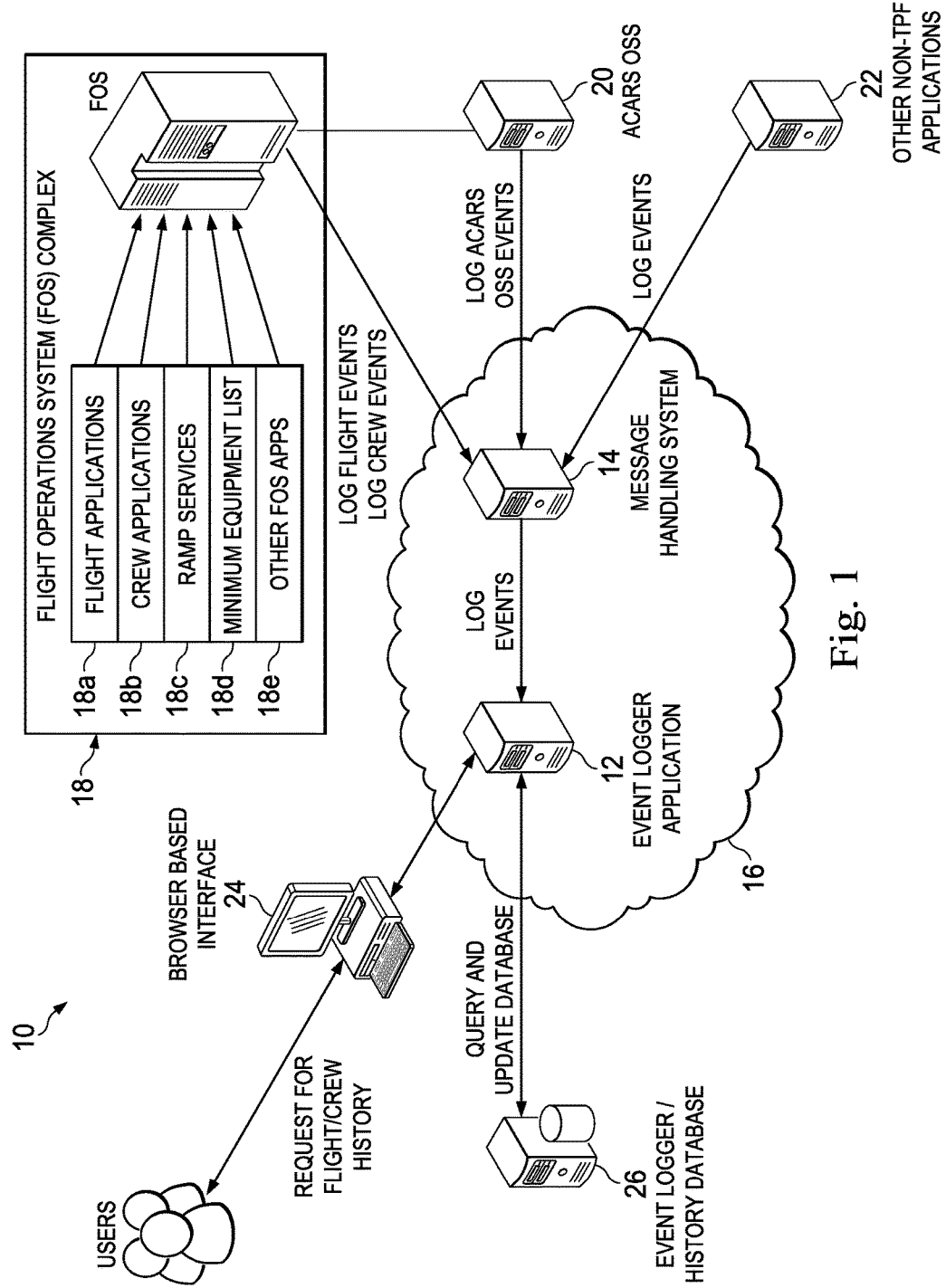
FIG. 1 is a diagrammatic illustration of a system, according to an exemplary embodiment.

In an exemplary embodiment, as illustrated in FIG. 1, an event logging and searching system is generally referred to by the reference numeral 10 and includes an event logger application 12. A message handling system 14 is in communication with the event logger application 12 via a network 16. A flight operations system (FOS) 18 is in communication with the message handling system 14 via the network 16. The FOS 18 includes one or more of the following: flight applications 18a, crew applications 18b, ramp services 18c, minimum equipment list 18d, and one or more other FOS applications 18e. An Aircraft Communications Addressing and Reporting System (ACARS) Operational Support System (OSS) 20 is in communication with the message handling system 14 via the network 16. In an exemplary embodiment, the ACARS OSS 20 is part of the FOS 18 and is a TPF system. In an exemplary embodiment, the ACARS OSS 20 is not part of the FOS 18 and is a non-TPF system. One or more other non-TPF applications 22 are in communication with the message handling system 14 via the network 16. A user device 24 is in communication with the event logger application 12 via the network 16. A database 26 is in communication with the event logger application 12 via the network 16.

In several exemplary embodiments, one or more exemplary embodiments of the message handling system 14 are described and illustrated in whole or in part in U.S. application Ser. No. 11/119,787, filed May 2, 2005, which issued on Dec. 11, 2012 as U.S. Pat. No. 8,332,473 to Fouts et al., the entire disclosures of which are hereby incorporated herein by reference. In an exemplary embodiment, the network 16 includes the Internet, one or more local area networks, one or more wide area networks, one or more cellular networks, one or more wireless networks, one or more voice networks, one or more data networks, one or more communication systems, or any combination thereof.

Figure 2:
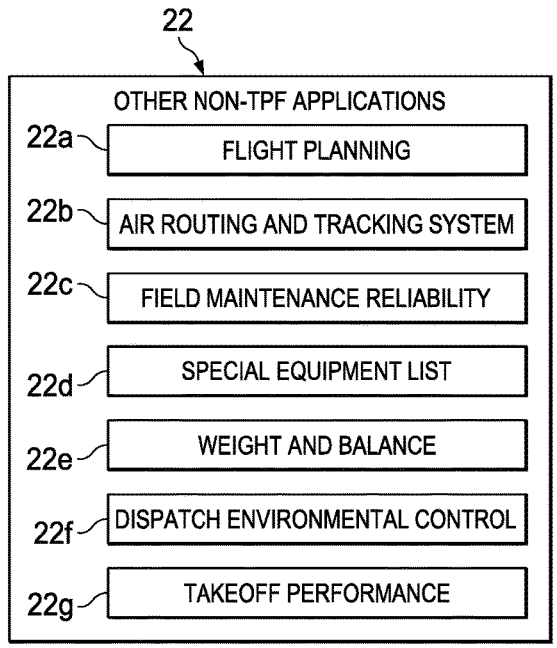
FIG. 2 is a diagrammatic illustration of a component of the system of FIG. 1, according to an exemplary embodiment.

In an exemplary embodiment, as illustrated in FIG. 2 with continuing reference to FIG. 1, the other non-TPF applications 22 include one or more of the following: flight planning 22a, air routing and tracking system 22b, field maintenance reliability 22c, special equipment list 22d, weight and balance 22e, dispatch environmental control 22f, and takeoff performance 22g.

Figure 3:
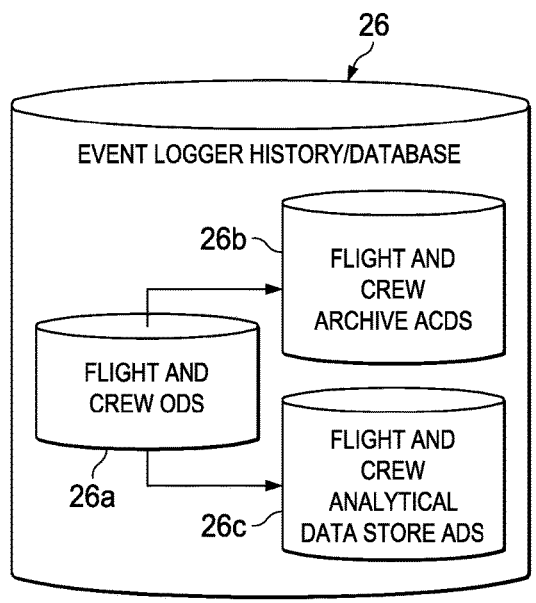
FIG. 3 is a diagrammatic illustration of another component of the system of FIG. 1, according to an exemplary embodiment.

In an exemplary embodiment, as illustrated in FIG. 3 with continuing reference to FIGS. 1 and 2, the database 26 includes a flight and crew operational data store (ODS) 26a, which is in communication with the event logger application 12. A flight and crew archive data store (ACDS) 26b is in communication with the flight and crew ODS 26a. A flight and crew application analytical data store (ADS) 26c is in communication with the flight and crew ODS 26a. In an exemplary embodiment, the flight and crew ADS 26c is in communication with the flight and crew ACDS 26b. In an exemplary embodiment, the flight and crew ODS 26a is adapted to contain live historical event data that is received from, for example, the FOS 18 via the message handling system 14, and is persisted by the event logger application 12. In an exemplary embodiment, the flight and crew ACDS 26b is adapted to store data that no longer resides in the flight and crew ODS 26a or the flight and crew ADS 26c. In an exemplary embodiment, the flight and crew ADS 26c is adapted to store data that is used in analytics; data is adapted to be replicated from the flight and crew ODS 26a to the flight and crew ADS 26c. In an exemplary embodiment, the flight and crew ADS 26c is adapted to be accessed when a user performs batch queries on large amounts of data. In several exemplary embodiments, the flight and crew ADS 26c is combined with the flight and crew ACDS 26b.

Figure 4:
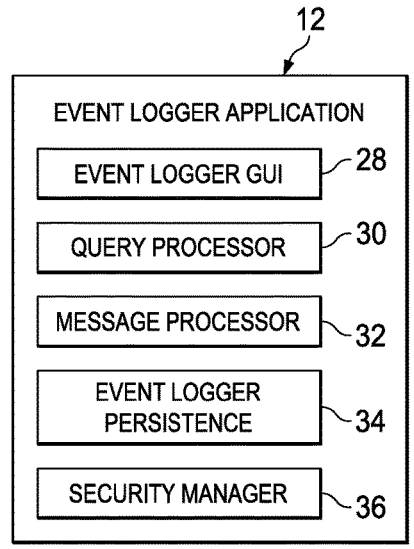
FIG. 4 is a diagrammatic illustration of yet another component of the system of FIG. 1, according to an exemplary embodiment.

In an exemplary embodiment, as illustrated in FIG. 4 with continuing reference to FIGS. 1-3, the event logger application 12 includes the following components: an event logger graphical user interface (GUI) 28; a query processor 30; a message processor 32; an event logger persistence component 34; and a security manager 36.

Figure 5:
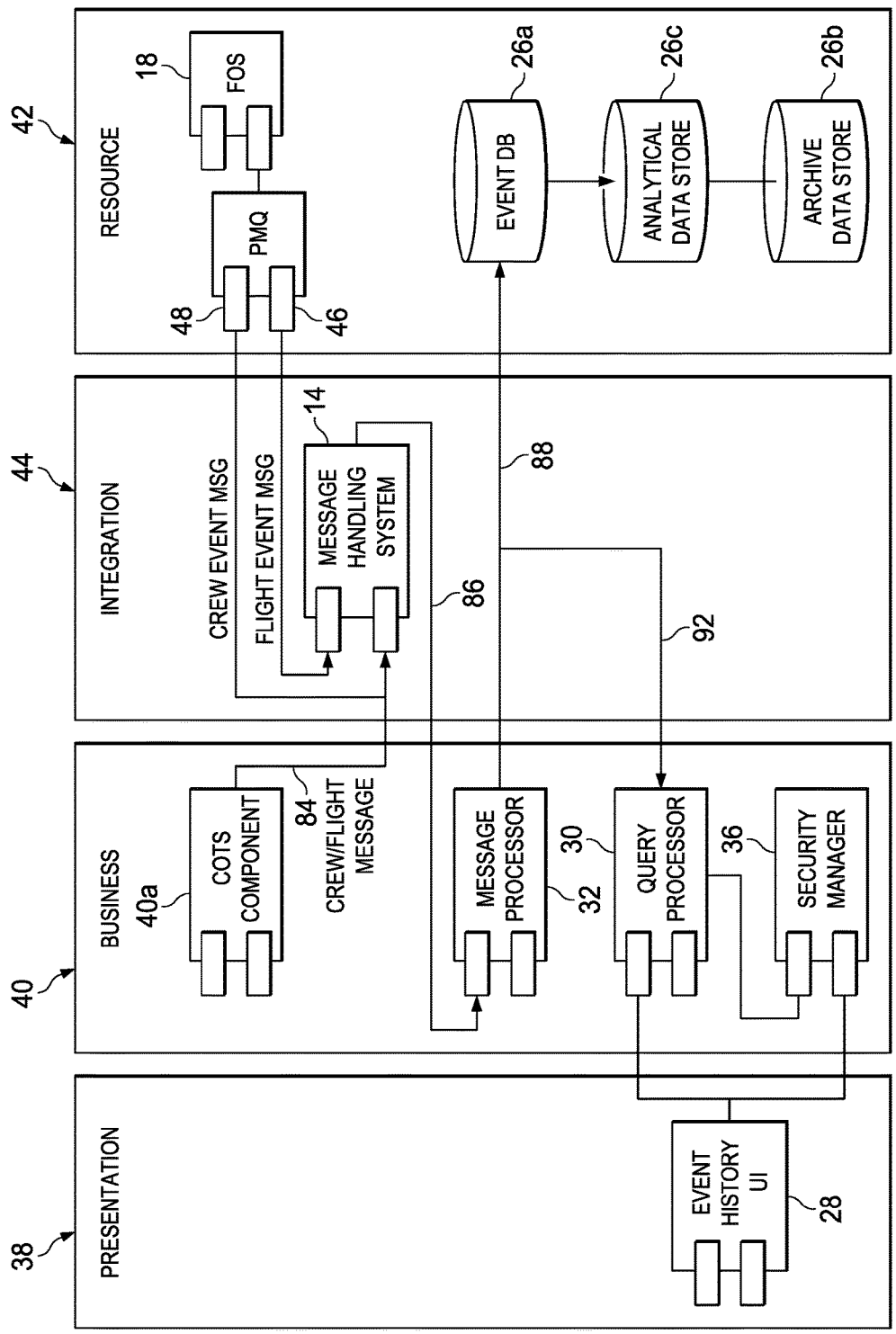
FIG. 5 is another diagrammatic illustration of the system of FIG. 1, according to an exemplary embodiment.

In an exemplary embodiment, as illustrated in FIG. 5 with continuing reference to FIGS. 1-4, the event logger application 12 is an n-tier pattern with a web/presentation tier 38 providing presentation, an application/business tier 40 running business components such as a Commercial Off-The-Shelf (COTS) component 40a shown in FIG. 5, and a resource/database tier 42 for data persistence. In several exemplary embodiments, the COTS component 40a is one of the other non-TPF applications 22. The message handling system 14 resides in an integration tier 44 and acts as the event logger application 12's interface to the FOS 18. Applications in the FOS 18 push messages to the event logger application 12 via the message handling system 14. The ACARS OSS 20 and the other non-TPF applications 22 push messages to the event logger application 12 via the message handling system 14. The event logger GUI 28 resides in the web/presentation tier 38, and the message processor 32, the query processor 30, and the security manager 36 reside in the application/business tier 40. As shown in FIG. 5, the FOS 18 pushes flight messages to the message handling system 14 via a protected message queue (PMQ) 46. The FOS 18 pushes crew messages to the message handling system 14 via a PMQ 48.

In an exemplary embodiment, in the web/presentation tier 38, the event logger GUI 28 is used to query flight and crew events; in an exemplary embodiment, the event logger GUI 28 uses Query Processor JAX-WS client. In an exemplary embodiment, in the web/presentation tier 38, open source frameworks are used to provide the event logger GUI 28 event handling and name/value pair mappings. In an exemplary embodiment, in the application/business tier 40, the query processor 30 accepts and performs query requests from the event logger GUI 28; the message processor 32 receives messages from the FOS 18 via the message handling system 14 and persists the messages into the flight and crew ODS 26a.

In an exemplary embodiment, the event logger application 12 provides a solution for viewing flight and crew history information from various systems at a centralized location, providing a front end application that submits requests to retrieve flight or crew history. In an exemplary embodiment, the web/presentation tier 38 resides on the server side and is responsible for presenting the information to the user. In an exemplary embodiment, the application/business tier 40 includes application components that encapsulate business functionality. In an exemplary embodiment, the integration tier 44 includes component(s) necessary to interface with resources, TPF systems, and non-TPF systems; these component(s) include the message handling system 14. In an exemplary embodiment, the resource/database tier 42 contains TPF-based legacy applications, data sources, and other external entities such as authentication services.

In several exemplary embodiments, the application, platform, and infrastructure associated with the web/presentation tier 38, the application/business tier 40, the resource/database tier 42, and the integration tier 44 are set forth in the table below:

| Tier | Mechanism | Container | Platform | API |
|---|---|---|---|---|
| Client | HTML/Javascript (JQuery)/ JSPs (JSTL)/display | Internet Explorer | Windows | HTML 4.0/5.0 |
| Presentation 38 | Session management | WebSphere 7.0 application server | Java EE | HTML, JSP, Servlet |
| | Personalization management | WebSphere 7.0 application server | Java EE | Java EE 5 Spring MVC |
| | AACM Authentication | IHS with SiteMinder Web Agent | Linux | Agent API |
| Business 40 | Search Service — JAX-WS web service/Session Beans | WebSphere 7.0 application server | Java EE | Java EE 5 EJB 3.0 |

-continued

| Tier | Mechanism | Container | Platform | API |
|---|---|---|---|---|
| | Persistence Service — MDBs/Session Beans | WebSphere 7.0 application server | Java EE | Java EE 5 EJB 3.0 |
| Integration 44 | Remote Interface Naming service Connection pooling Messaging service | WebSphere 7.0 application server WebSphere MQ | Java EE | EJB 3.0 JNDI JDBC/JPA 2.0 JMS/EJB 3.0 |
| Data Resource 42 | Data store | Oracle 11g | UNIX | JDBC |

Figure 6:
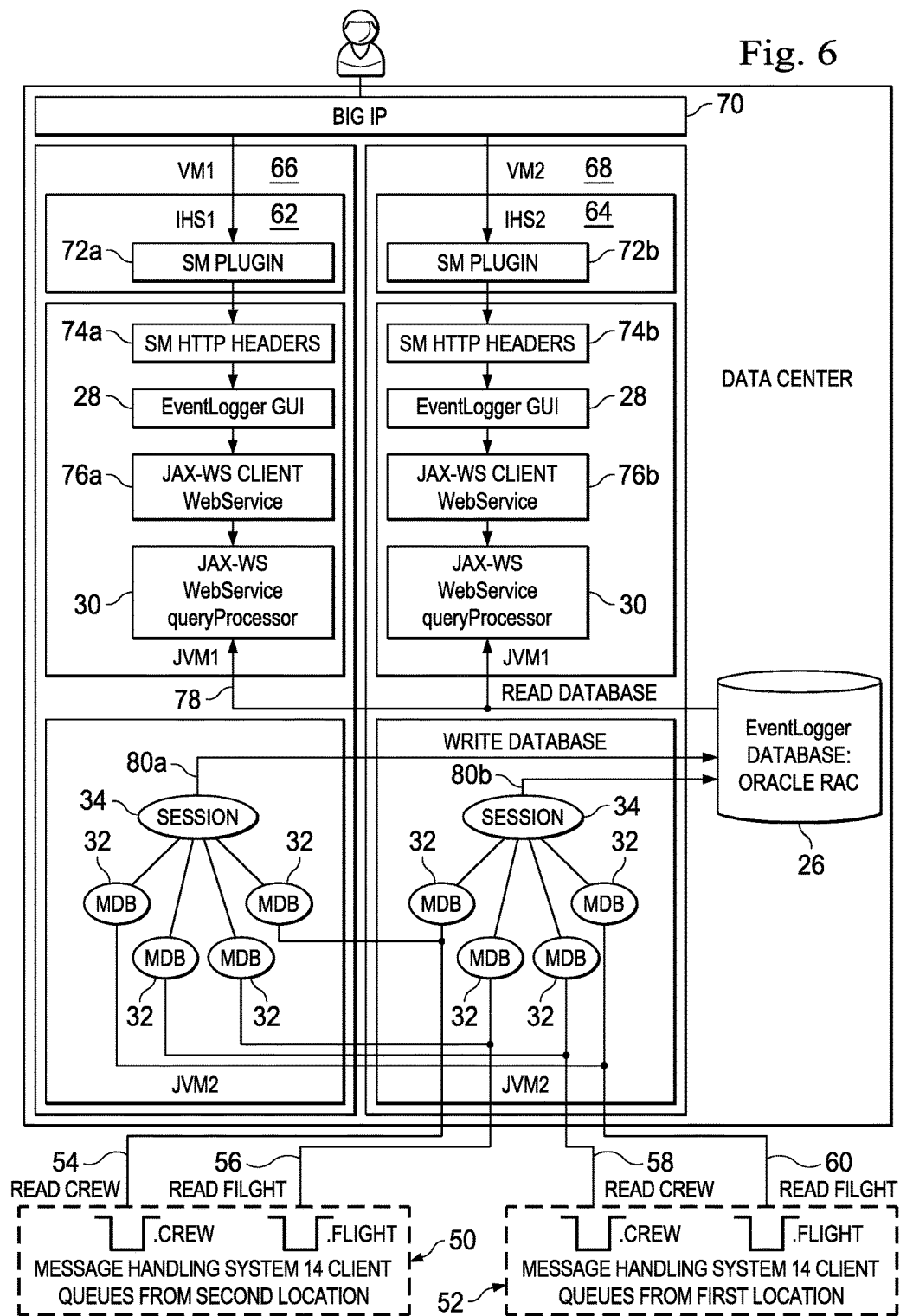
FIG. 6 is a diagrammatic illustration of a configuration of the system of FIGS. 1 and 5, according to an exemplary embodiment.

In an exemplary embodiment, as illustrated in FIG. 6 with continuing reference to FIGS. 1-5, the message handling system 14 is distributed among a plurality of locations including, for example, locations 50 and 52. In an exemplary embodiment, the location 52 is remotely located from the location 50. At the location 50, the message handling system 14 includes client (or read) queues 54 and 56 for crew and flight messages, respectively. At the location 52, the message handling system 14 includes client (or read) queues 58 and 60 for crew and flight messages, respectively. In an exemplary embodiment, the client (or read) queues 54 and 58 at least partially constitute the PMQ 48 illustrated in FIG. 5. In an exemplary embodiment, the client (or read) queues 56 and 60 at least partially constitute the PMQ 46 illustrated in FIG. 5. The web/presentation tier 38 includes machines 62 and 64; in an exemplary embodiment, the machines 62 and 64 are JAVA virtual machines running IBM HTTP Server (IHS) 7. The application/business tier 40 includes machines 66 and 68; in an exemplary embodiment, the machines 66 and 68 are JAVA virtual machines running IBM WebSphere Application Server (WAS) 7. In an exemplary embodiment, the IHS servers of the machines 62 and 64 operate to load balance requests to the WAS application servers of the machines 66 and 68. In an exemplary embodiment, the WAS application servers of the machines 66 and 68 consume the Message Queue (MQ) messages from the message handling system 14 via the client (or read) queues 54, 56, 58, and 60. In an exemplary embodiment, clients (users) employing the event logger GUI 28 are load balanced by one or more BIG-IP® devices 70, which are available from F5 Networks, Inc., Seattle, Wash. In an exemplary embodiment, the one or more BIG-IP devices 70 include one or more BIG-IP® LTM devices. In an exemplary embodiment, a security socket layer (SSL) certificate is installed on the one or more BIG-IP devices 70 to facilitate HTTPS communication. In an exemplary embodiment, the web/presentation tier 38 utilizes siteminder plugins 72a and 72b to authenticate users. In an exemplary embodiment, the resource/database tier 42 utilizes a shared database cluster, which is, includes, or is part of, the database 26; in an exemplary embodiment, the resource/database tier 42 utilizes a shared Oracle® database cluster. In an exemplary embodiment, specific lightweight directory access protocol (LDAP) headers are forwarded from the siteminder plugins 72a and 72b to the WAS application servers of the machines 66 and 68 (to the respective event logger GUIs that at least partially constitute the event logger GUI 28) via HTTP headers 74a and 74b. The query processors that at least partially constitute the query processor 30 are in communication with the event logger GUIs that at least partially constitute the event logger GUI 28 using JAX-WS web service clients 76a and 76b, respectively. The query processors that at least partially constitute the query processor 30 are in communication with the database 26 via at least a read queue 78. The message processors that at least partially constitute the message processor 32 are in communication with the message handling system 14 at the location 50 via the client (or read) queues 54 and 56. The message processors that at least partially constitute the message processor 32 are in communication with the message handling system 14 at the location 52 via the client (or read) queues 58 and 60. As shown in FIG. 6, in an exemplary embodiment, the message processor 32 includes at least eight (8) message-driven beans. In an exemplary embodiment, four (4) of the eight (8) message-driven beans of the message processor 32 are part of the machine 66 and read respective messages from the client (or read) queues 54, 56, 58, and 60; the other four (4) message-driven beans of the message processor 32 are part of the machine 68 and also read respective messages from the client (or read) queues 54, 56, 58, and 60. In an exemplary embodiment, the event logger persistence component 34 includes at least two (2) session beans, with one session bean being in communication with the four (4) message-driven beans of the query processor 30 that are part of the machine 66, and the other session bean being in communication with the four (4) message-driven beans of the message processor 32 that are part of the machine 68. The respective session beans of the event logger persistence component 34 are in communication with the database 26 via write queues 80a and 80b.

In several exemplary embodiments, the event logger persistence component 34 is part of the message processor 32.

Figure 7:
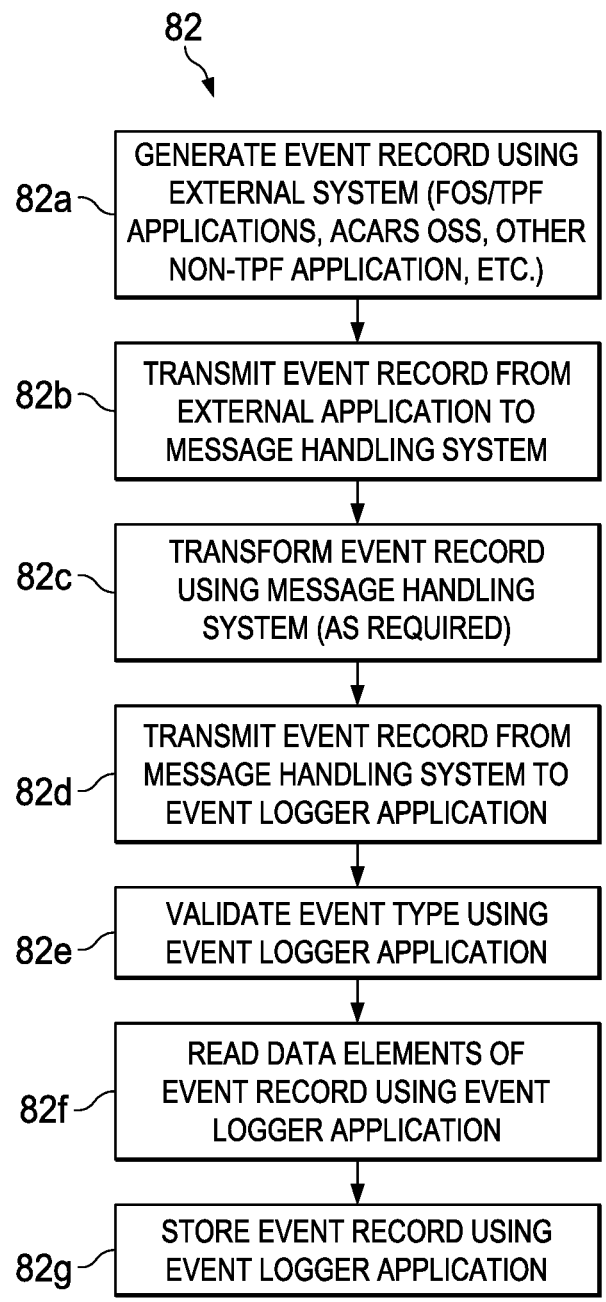
FIG. 7 is a flow chart illustration of a method of capturing an event using the system of FIGS. 1 and 5, according to an exemplary embodiment.

In an exemplary embodiment, as illustrated in FIG. 7 with continuing reference to FIGS. 1-6, a method of capturing history events using the system 10 is generally referred to by the reference numeral 82 and includes generating an event record, or event message, at step 82a. The event record or message describes a history event such as a flight history event or a crew history event. In several exemplary embodiments, at the step 82a, the event record or message is generated using an external application such as, for example, the FOS 18, the ACARS OSS 20, or one of the non-TPF applications 22. At step 82b, the event record generated at the step 82a is transmitted from the external application to the message handling system 14. In an exemplary embodiment, at the step 82b, the event record is transmitted to the message handling system 14 via the PMQ 46 or 48 so long as the event record was generated using the FOS 18 at the step 82; otherwise the event record is transmitted to message handling system 14 via another queue such as, for example, a queue 84 (FIG. 5) via which the COTS component 40a communicates with the message handling system 14.

At step 82c, if required, the event record is transformed using the message handling system 14. In several exemplary embodiments, at the step 82c, the event record is transformed, in whole or in part, in accordance with one or more steps, methods, etc. described and illustrated in whole or in part in U.S. application Ser. No. 11/119,787, filed May 2, 2005, which issued on Dec. 11, 2012 as U.S. Pat. No. 8,332,473 to Fouts et al., the entire disclosures of which are hereby incorporated herein by reference. In several exemplary embodiments, the step 82c is executed when the event record or message is generated using the ACARS OSS 20 or one of the non-TPF applications 22. In an exemplary embodiment, the event record or message generated at the step 82a includes a completely structured message payload in XML format that can be translated into a common event XML format; at the step 82c the message is transformed by the message handling system 14 into a defined business event structure.

At step 82d, the event record is transmitted from the message handling system 14 to the event logger application 12. In an exemplary embodiment, at the step 82d, the event record is transmitted from the message handling system 14 to the message processor 32 of the event logger application 12 via at least one of the client (or read) queues 54, 56, 58, and 60 shown in FIG. 6. In an exemplary embodiment, at the step 82d, the event record is transmitted from the message handling system 14 to the message processor 32 of the event logger application 12 via a queue 86 shown in FIG. 5 (in several exemplary embodiments, the queue 86 includes the queues 54, 56, 58, and 60).

At step 82e, the event record is validated using the event logger application 12. At step 82f, data elements of the event record are read by the event logger application 12. In an exemplary embodiment, at the step 82f, the data elements of the event record are read by the message processor 32 of the event logger application 12. At step 82g, the event record is stored using the event logger application 12. In an exemplary embodiment, at the step 82g, the event record is stored using the event logger persistence component 34, which persists history data of the event record to the database 26 via the queue 80a or 80b. In an exemplary embodiment, at the step 82g, the event record is stored in the flight and crew ODS 26a of the database 26 via a queue 88 (FIG. 5), via which the message processor 32 communicates with the flight and crew ODS 26a.

Figure 8:
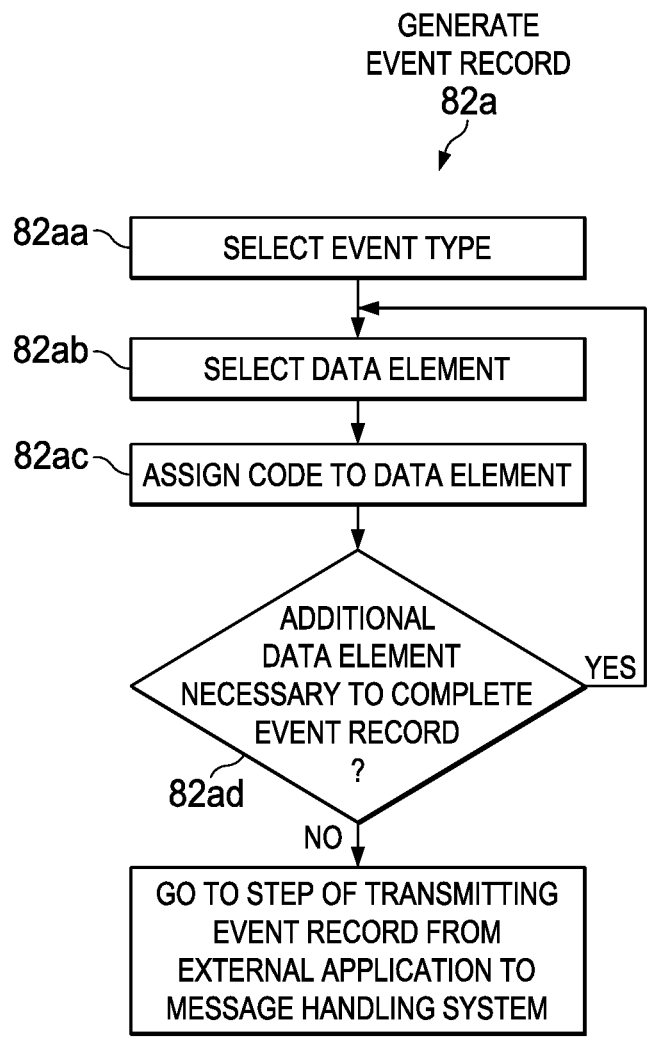
FIGS. 8 and 9 are flow chart illustrations of respective steps of the method of FIG. 7, according to an exemplary embodiment.

In an exemplary embodiment, as illustrated in FIG. 8 with continuing reference to FIGS. 1-7, the step 82a includes selecting an event type at step 82aa, selecting a data element at step 82ab, and assigning a code to the data element at step 82ac. At step 82ad, it is determined whether an additional data element is necessary to complete the event record. If so, the steps 82ab, 82ac, and 82ad are repeated until it is determined at the step 82ad that an additional data element is not needed to complete the event record. After this determination, the step 82b is executed.

Exemplary embodiments of flight history events that may be captured at the step 82a are described below, and codes that may be assigned at the step 82ac are listed below:
Flight/Date/Departure Station/Dupe Code
Flight/Date/Departure Station/Action code
Flight/Date/Departure Station Start date/time and End date/time
LNIATA (Device ID)
Agent sine or employee number
Aircraft/Date/Station (if applicable)
Timestamp (time that event occurred). The time stamp associated with a Flight or Crew event must include the year, month, day, hour, minutes, seconds, and 10ths of seconds, when available. When 10ths of seconds are not available, input will be zero in 10ths of second field.

Flight History Types:
ACARS
SV ACARS Ground Voice Request (Undelivered Messages)
ARTS
AN Automated Aircraft assignments
RN Aircraft assignment Changes
DECS
CA Dispatcher Assignment Changes
AX Enroute Point Addition
DC Diversion Entries
DM Delay Message
FF Flight Forecast
FR Manual Flight Setup
GG Gate Message
PR Position Reports
QU ACARS Uplink
RD Stub Origination Entries
RH Flight History remarks
XL Cancellation Entries-Flight Plan
JF FIDS Updates
BS SOC Daily Log
Flight Planning Data
JR Flight Plan Release
JRA Flight Plan Filing
WX Weather Briefings
PC Pre-departure Clearance
   Flight Plan
Weight and Balance
CL CLM (Cargo Load Message)
DR Ramp Services
WB Load Planning Entries
Take-Off Power System
TW Terminal Weather
Crew Information Logged to Flight History
AT Crew Alerts
HD Deadhead booking Teletype messages
Miscellaneous
CT VHF Air/Ground Radio Clearance
PA Pre-Condition Air
JJ Flight Plan retrieval by the Captain Exemplary embodiments of crew history events that may be captured at the step 82a are described below, and codes that may be assigned at the step 82ac are listed below:
Employee number
Employee last name, first name, middle initial
Date
Event type
LNIATA
Agent sine or employee number
Contractual month
Timestamp (time that event occurred)
CREW History types:
1 Qualification purge
2 Trip sequence removals
3 Qualifications updates
4 Permanent crew base transfers
5 Temporary crew base transfers
6 Qualification Expiration Notices
7 Bid Award Transactions and Vacation Bank Adjustments
8 Hotel Cancellation
10 Line Check/Qualification Completions
11 Crew member Rating Completions
12 Recurrent Training Completions
13 Requalification Completions
14 Medical Completion 19 Sequence Assignment, Sequence Modifications and Make-up Lists
20 Sick Calls, Other Planned Absences and Misc. Credits
21 Automatic Removal by Recurrent Training Model
22 Administrative Crew Qualification & Seniority List Corrections
23 Reserve List Updates and RAP assignments
24 Operating & Deadheading Crew member Exceptions
25 Planned Absence Purge
26 Crew member CPA Time Updates
30 Crew member Trip Sign-in History (includes standby)
31 FOS E-mail History
32 Duty Free Period Modifications, Standby Assignments, TT Authorizations, other miscellaneous entries
40 Crew member Message Send
44 Trip Trade Bulletin Board
48 Duty Free Period Information
49 AVRS History and CPA Payout Requests
50 Flt Time Apportionment SS Entry Code
55 To be defined
56 Trip Trade & Trip Trade with Open Time
60 Check Airman System Updates
70 To be defined
99 Flight Attendants on Make-up list
101/112 Remarks for a month
201/212 Remarks for a month
255 HISEND Personal Mode Remarks In an exemplary embodiment, at the step 82c, a flight event message has a structure that includes a header, body, and relationships. In an exemplary embodiment, at the step 82c, all flight event messages conform to a standard XML schema. The event logger application 12 requires that the event record or message, which at the step 82d is transmitted from the message handling system 14 to the event logger application 12, conform to the standard XML schema. Similarly, in an exemplary embodiment, at the step 82c, a crew event message has a structure that includes a header, body, and relationships. In an exemplary embodiment, at the step 82c, all crew event messages conform to a standard XML schema. The event logger application 12 requires that event record or message, which at the step 82d is transmitted from the message handling system 14 to the event logger application 12, conform to the standard XML schema.

Figure 9:
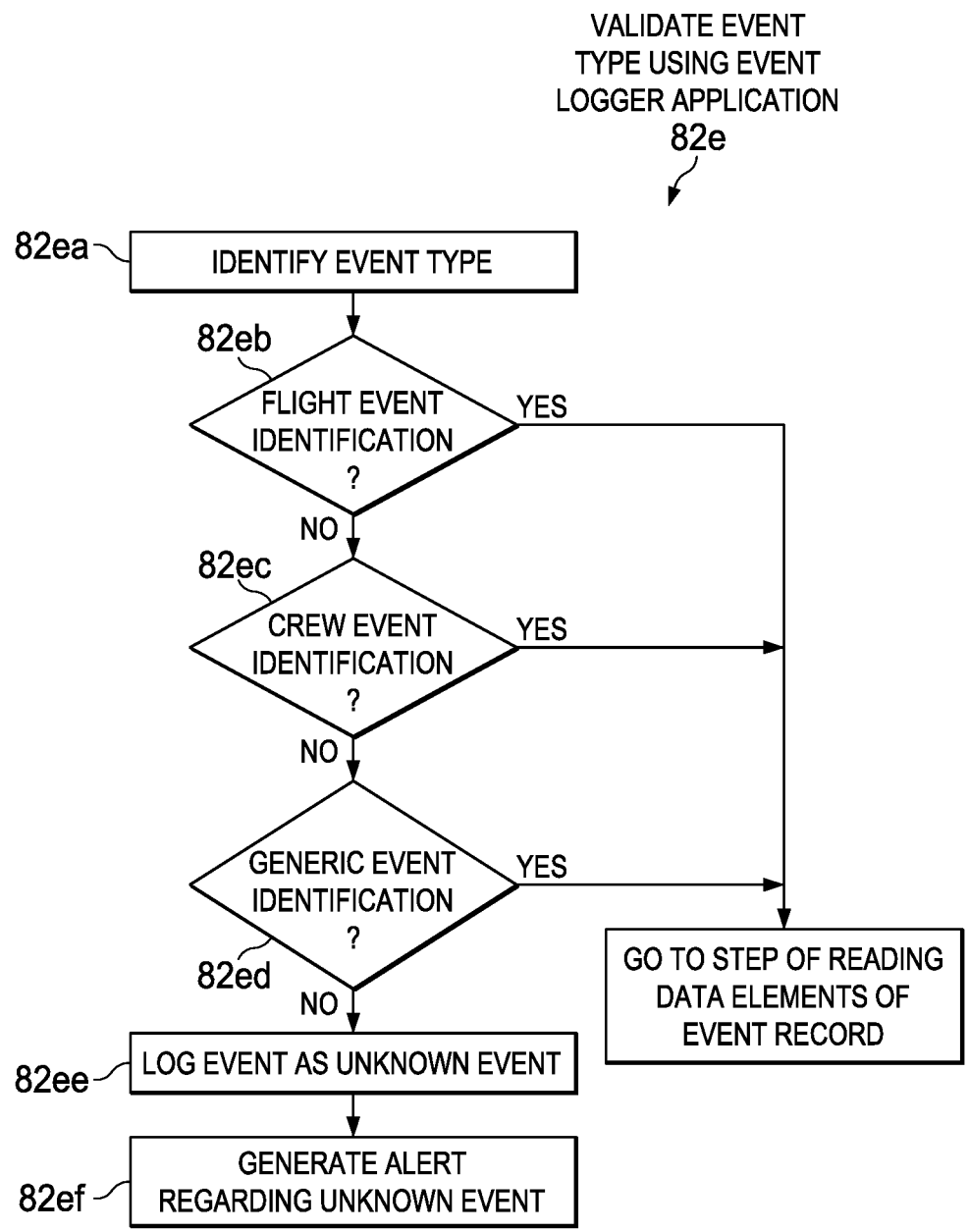

In an exemplary embodiment, as illustrated in FIG. 9 with continuing reference to FIGS. 1-8, to validate the event type using the event logger application 12 at the step 82e, the event type is identified at the step 82ea, and it is determined whether the event type is a flight event, crew event, or a generic event at the steps 82eb, 82ec, and 82ed, respectively. If the event type is a flight event, crew event, or a generic event, then the step 82f is executed. If the event type is not a flight event, crew event, or a generic event, then the event record is logged as unknown at step 82ee and an alarm is generated at step 82ef.

In an exemplary embodiment, at the step 82f, the message processor 32 parses the XML of the flight or crew event message received from the message handling system 14, the message conforming to a standard XML schema. In several exemplary embodiments, since the messages transmitted from the message handling system 14 at the step 82d conform to the same standard XML schema (due to the as-required operation of the message handling system 14 at the step 82c), the message processor 32 can easily parse the XML of the flight or crew event record or message, regardless of whether the event record or message was generated using the FOS 18, the ACARS OSS 20, or one of the non-TPF applications 22.

In an exemplary embodiment, at the step 82g, the event logger persistence component 34 persists into the database 26 the history data of the flight or crew event message, the XML of which was parsed by the message processor 32 at the step 82f. In an exemplary embodiment, at the step 82g, if the event record is a flight event message, the history data of the flight event message is persisted into a flight table in the database 26. In an exemplary embodiment, at the step 82g, if the event record is a crew event message, the history data of the crew event message is persisted into a crew table in the database 26. In an exemplary embodiment, there is no relationship between the flight table and the crew table in the database 26.

An exemplary embodiment of the structure of a flight table in the database 26 is set forth below:
"EVL_ADM"."FLIGHT_EVENT"
("ACTION_CODE" VARCHAR2(6 CHAR),
  "EMPLOYEE_NBR" VARCHAR2(7 CHAR),
  "INPUT_DEVICE" VARCHAR2(8 CHAR),
  "MSG_SEQUENCE" NUMBER(10,0),
  "PERSONALID" VARCHAR2(8 CHAR),
  "TEXT" CLOB,
  "EVENT_TYPE" VARCHAR2(12 CHAR),
  "DEP_STA" VARCHAR2(4 CHAR),
  "DUP_DEP_STA_NUM" VARCHAR2(3 CHAR),
  "FLT_NUM" VARCHAR2(5 CHAR),
  "FLT_ORG_DATE" DATE,
  "IATA" VARCHAR2(3 CHAR),
  "ICAO" VARCHAR2(4 CHAR),
  "ARR" VARCHAR2(4 CHAR),
  "DUP_ARR_STA_NUM" VARCHAR2(3 CHAR),
  "STA" TIMESTAMP (6),
  "STD" TIMESTAMP (6),
  "DATE_TIME" TIMESTAMP (6) WITH TIME ZONE,
  "ASSIGNEDTAIL" VARCHAR2(4 BYTE),
  "PARTITION" VARCHAR2(2 BYTE),
  "LTD" TIMESTAMP(6),
  "LTA" TIMESTAMP(6)
  "ASSIGNED_EQUIP_TYPE" VARCHAR2(4 BYTE),
  "AC_REG_NUM" VARCHAR2(8 BYTE),
  "LEG_STATUS" VARCHAR2(1 BYTE),
  "DEP_STATUS" VARCHAR2(1 BYTE),
  "ARR_STATUS" VARCHAR2(1 BYTE)
)

An exemplary embodiment of the structure of a crew table in the database 26 is set forth below:
"EVL_ADM"."CREW_EVENT"
("EMPLOYEE_NBR" VARCHAR2(7 CHAR),
  "EVENT_TYPE" VARCHAR2(12 CHAR),
  "LAST_NAME" VARCHAR2(18 CHAR),
  "FIRST_NAME" VARCHAR2(18 CHAR),
  "MID_INITIAL" VARCHAR2(1 CHAR),
  "IATA" VARCHAR2(3 CHAR),
  "ICAO" VARCHAR2(4 CHAR),
  "DATE_TIME" TIMESTAMP (6) WITH TIME ZONE,
  "CREW_TYPE" VARCHAR2(255 BYTE),
  "POPULATIONTYPE" VARCHAR2(255 BYTE),
  "AGENTID" VARCHAR2(255 BYTE),
  "HISTORY_TEXT" CLOB,
  "HISTORY_TIMESTAMP" TIMESTAMP (6),
  "HISTORY_TYPE" VARCHAR2(255 BYTE),
  "LNIATA" VARCHAR2(255 BYTE),
  "XML_HISTORY_REF" VARCHAR2(255 BYTE)
)

Figure 10:
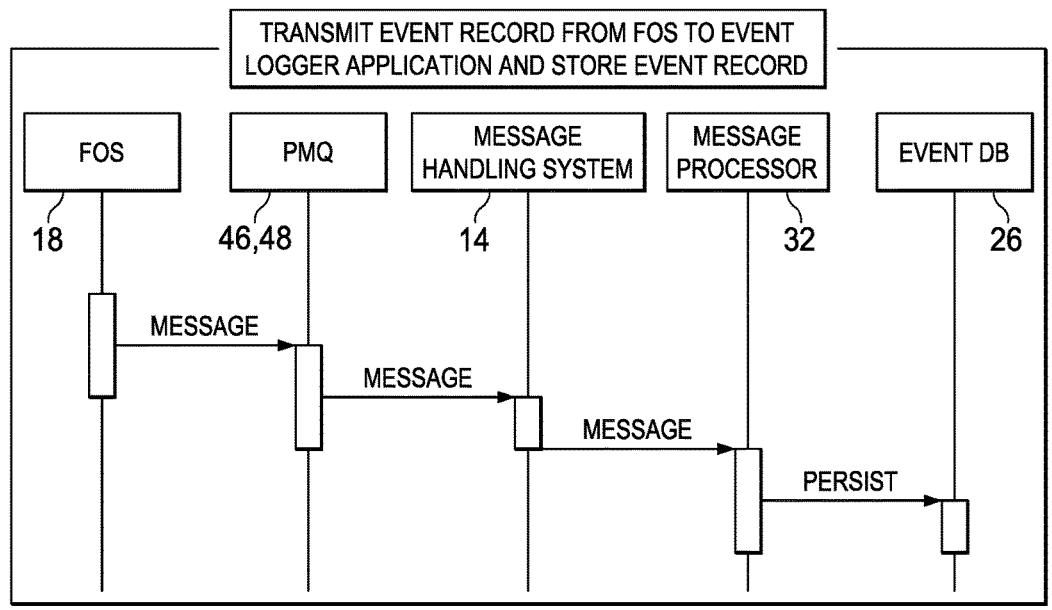
FIGS. 10 and 11 are diagrammatic illustrations of respective exemplary embodiments of steps of the method of FIG. 7.

In an exemplary embodiment, FIG. 10 depicts the execution of the method 82 when the event record is generated using the FOS 18. As shown in FIG. 10, the event record or message is transmitted from the FOS 18 to the message handling system 14 via the PMQ 46 or 48. The event record or message is transmitted from the message handling system 14 to the message processor 32, and the data of the message is persisted to the database 26.

Figure 11:
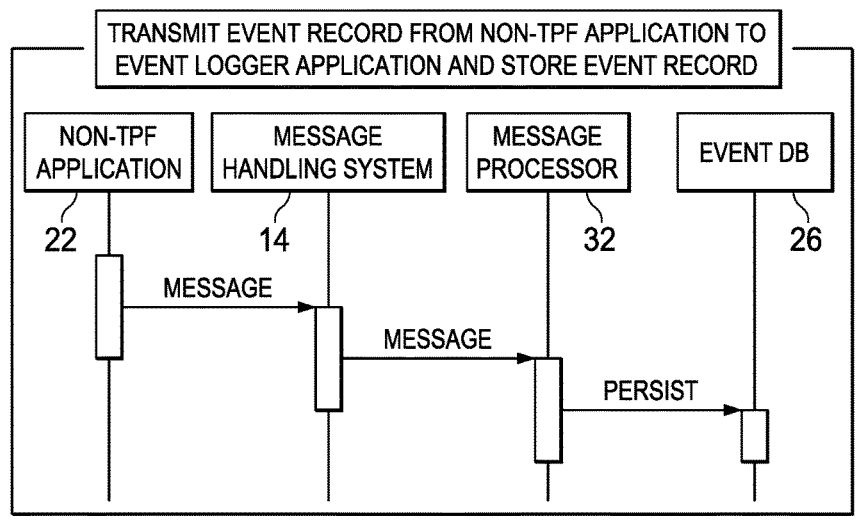

In an exemplary embodiment, FIG. 11 depicts the execution of the method 82 when the event record is generated using one of the non-TPF applications 22. As shown in FIG. 10, the event record or message is transmitted from the non-TPF application 22 to the message handling system 14. The message handling system 14 transforms the event record or message. The event record or message is transmitted from the message handling system 14 to the message processor 32, and the data of the message is persisted to the database 26.

Figure 12:
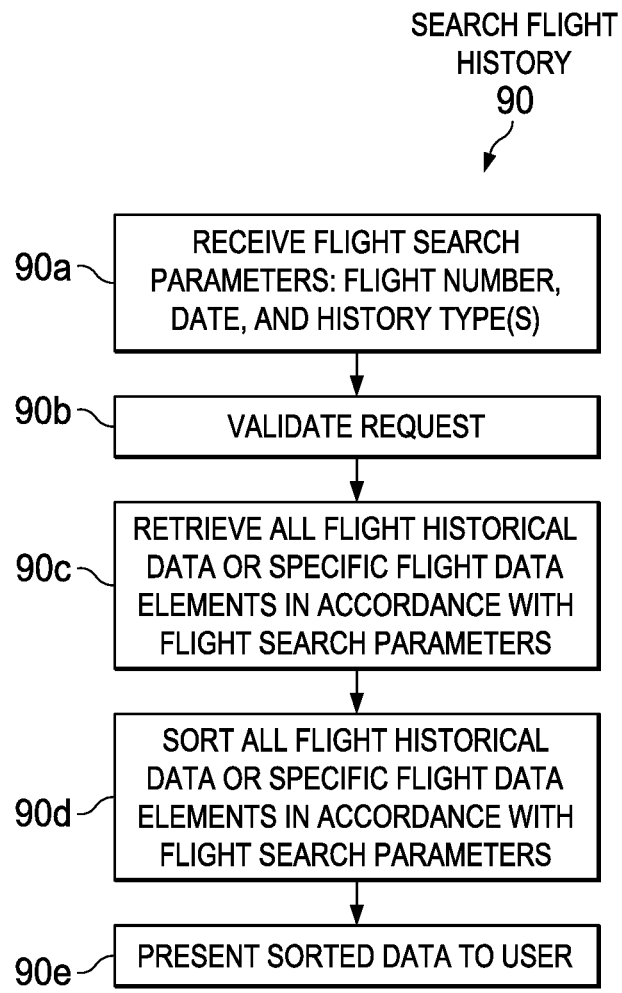
FIG. 12 is a flow chart illustration of a method of searching flight history using the system of FIGS. 1 and 5, according to an exemplary embodiment.

In an exemplary embodiment, as illustrated in FIG. 12 with continuing reference to FIGS. 1-11, a method of searching flight history is generally referred to by the reference numeral 90 and includes at step 90a receiving flight search parameters. In an exemplary embodiment, the flight search parameters received at the step 90a include the flight number, data, and history type(s). At step 90b, the request to search flight history is validated. At step 90c, all of the flight historical data or specific flight data elements are retrieved, in accordance with the flight search parameters received at the step 90a. At step 90d, either all of the flight historical data or the specific flight data elements are sorted in accordance with the flight search parameters received at the step 90a. At step 90e, the sorted data is presented. In an exemplary embodiment, at the step 90d the data is sorted by date/time stamp of event by default.

Figure 13:
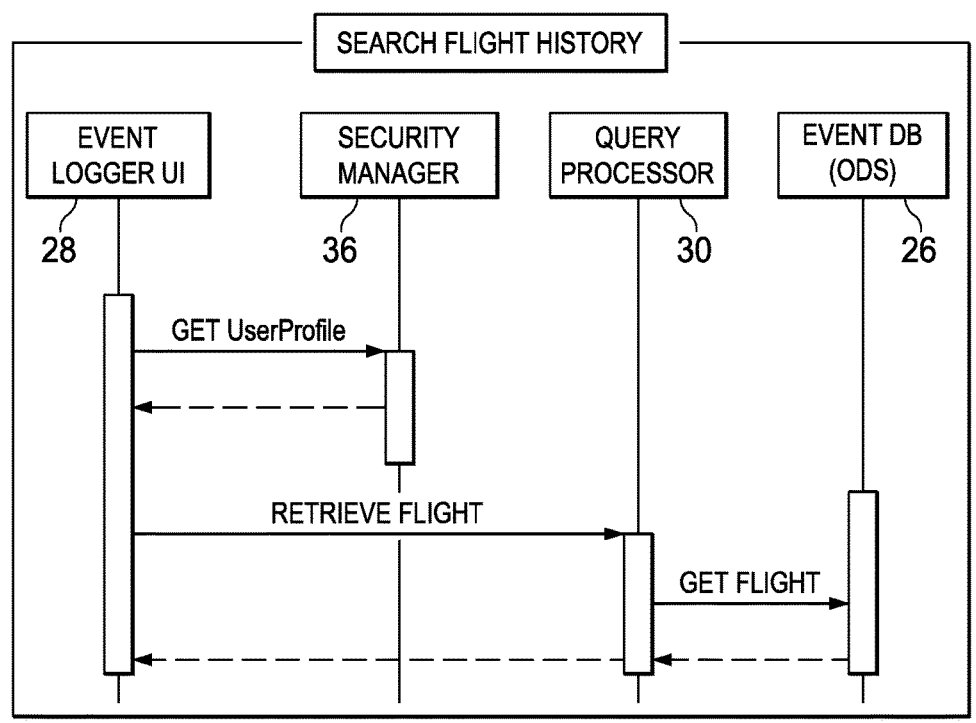
FIG. 13 is a diagrammatic illustration of the method of FIG. 12, according to an exemplary embodiment.

In an exemplary embodiment, FIG. 13 depicts the execution of the method 90. In an exemplary embodiment, at the step 90a, the flight search parameters are received using the event logger GUI 28. In an exemplary embodiment, at the step 90b, the request to search flight history is validated using the security manager 36. In an exemplary embodiment, at the step 90b, the security manager 36 determines privileges for the application group(s) of which a user profile associated with the request is a part. In an exemplary embodiment, the group(s) are retrieved from the LDAP directory (passed in the HTTP headers 74a and 74b shown in FIG. 6 in an exemplary embodiment). After the security manager 36 validates the request at the step 90b, the data is retrieved at the step 90c using the query processor 30, which obtains the data from the database 26. In an exemplary embodiment, at the step 90c the query processor 30 retrieves the data from the database 26 via at least the read queue 78 shown in FIG. 6. In an exemplary embodiment, at the step 90c the query processor 30 retrieves the data from the database 26 via at least a queue 92 shown in FIG. 5.

Figures 14, 15:
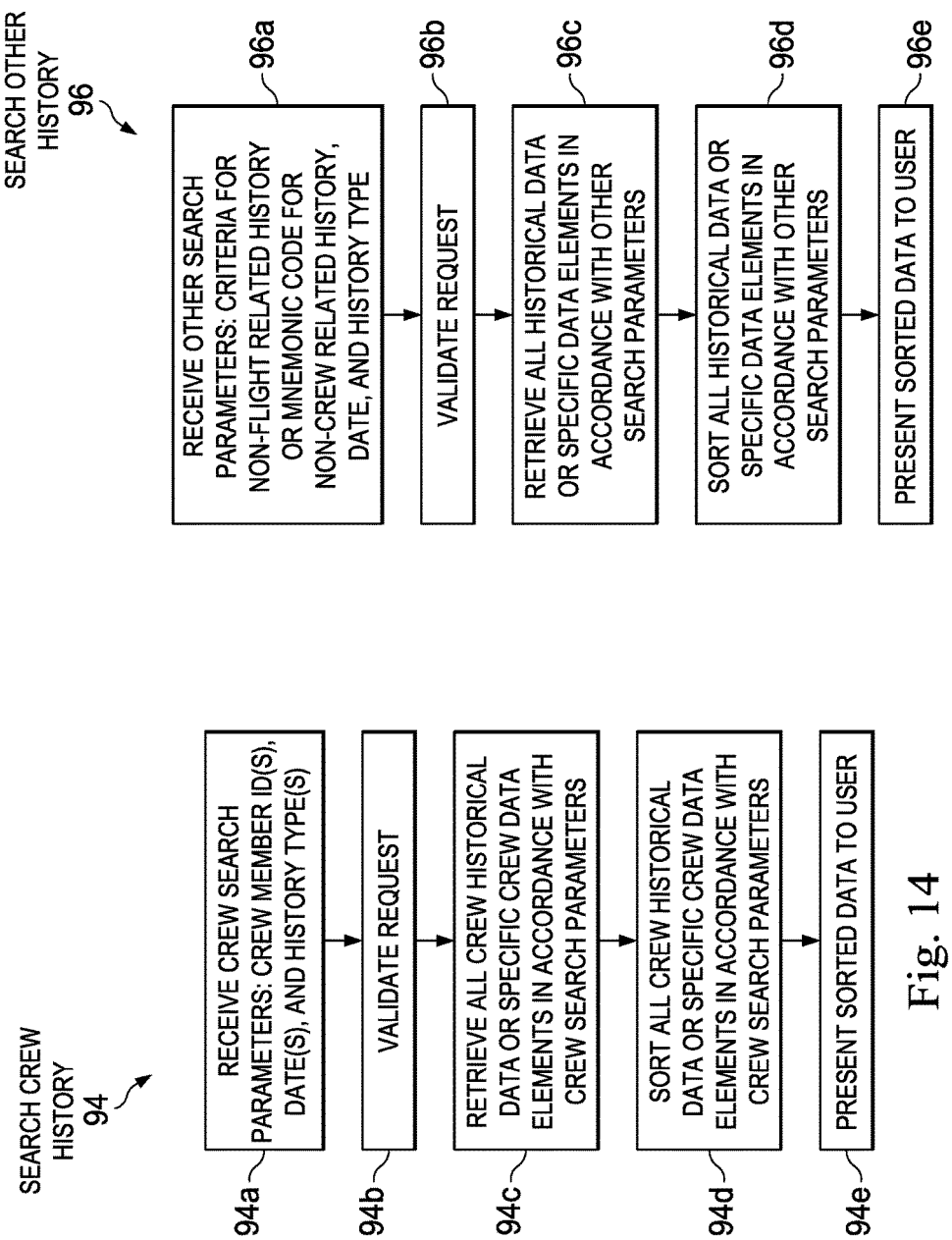
FIG. 14 is a flow chart illustration of a method of searching crew history using the system of FIGS. 1 and 5, according to an exemplary embodiment.
FIG. 15 is a flow chart illustration of a method of searching other history using the system of FIGS. 1 and 5, according to an exemplary embodiment.

In an exemplary embodiment, as illustrated in FIG. 14 with continuing reference to FIGS. 1-13, a method of searching crew history is generally referred to by the reference numeral 94 and includes at step 94a receiving crew search parameters. In an exemplary embodiment, the crew search parameters received at the step 94a include crew member ID(s), date(s), and history type(s). At step 94b, the request to search crew history is validated. At step 94c, all of the crew historical data or specific crew data elements are retrieved, in accordance with the crew search parameters received at the step 94a. At step 94d, either all of the crew historical data or the specific crew data elements are sorted in accordance with the crew search parameters received at the step 94a. At step 94e, the sorted data is presented. In an exemplary embodiment, at the step 94d the data is sorted by date/time stamp of event by default. In an exemplary embodiment, at the step 94a, the crew search parameters are received using the event logger GUI 28. In an exemplary embodiment, at the step 94b, the request to search crew history is validated using the security manager 36. In an exemplary embodiment, at the step 94b, the security manager 36 determines privileges for the application group(s) of which a user profile associated with the request is a part. In an exemplary embodiment, the group(s) are retrieved from the LDAP directory (passed in the HTTP headers 74a and 74b shown in FIG. 6 in an exemplary embodiment). After the security manager 36 validates the request at the step 94b, the data is retrieved at the step 94c using the query processor 30, which obtains the data from the database 26. In an exemplary embodiment, at the step 94c the query processor 30 retrieves the data from the database 26 via at least the read queue 78 shown in FIG. 6. In an exemplary embodiment, at the step 94c the query processor 30 retrieves the data from the database 26 via at least the queue 92 shown in FIG. 5.

In an exemplary embodiment, as illustrated in FIG. 15 with continuing reference to FIGS. 1-14, a method of searching other history is generally referred to by the reference numeral 96 and includes at step 96a receiving other search parameters. In an exemplary embodiment, the other search parameters received at the step 96a include criteria for non-flight related history. In an exemplary embodiment, the other search parameters received at the step 96a include mnemonic code for non-crew related history. In an exemplary embodiment, the other search parameters received at the step 96a include date and history type. In an exemplary embodiment, the other search parameters received at the step 96a include either criteria for non-flight related history or mnemonic code for non-crew related history, date, and history type. At step 96b, the request to search other history is validated. At step 96c, all of the historical data or specific data elements are retrieved, in accordance with the search parameters received at the step 96a. At step 96d, either all of the historical data or the specific data elements are sorted in accordance with the search parameters received at the step 96a. At step 96e, the sorted data is presented. In an exemplary embodiment, at the step 96d the data is sorted by date/time stamp of event by default.

Figure 16:
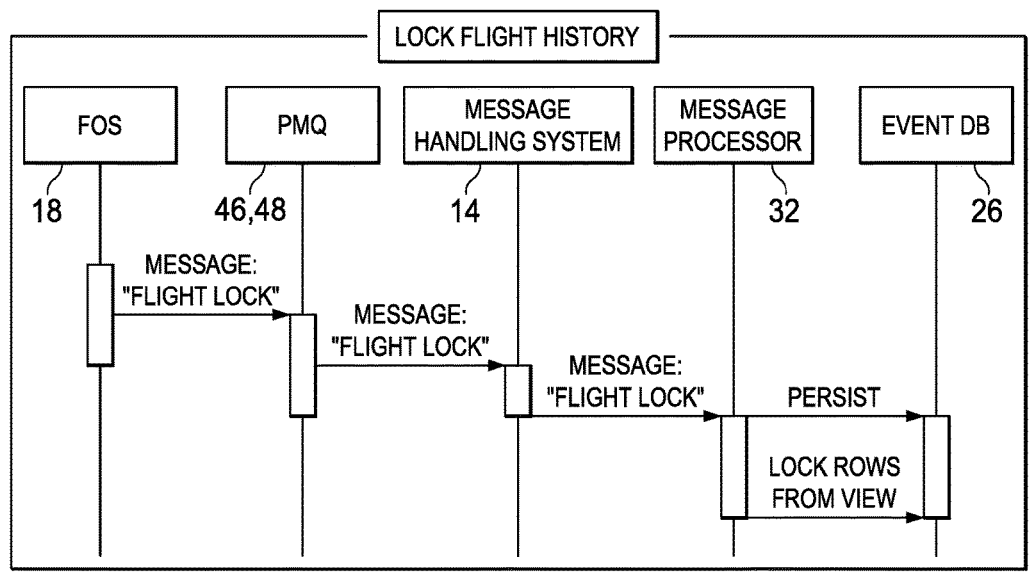
FIG. 16 is a diagrammatic illustration of a method of locking a flight history using the system of FIGS. 1 and 5, according to an exemplary embodiment.

In an exemplary embodiment, as illustrated in FIG. 16 with continuing reference to FIGS. 1-15, a flight lock command or message may be transmitted from the FOS 18 to the message handling system 14 via the PMQ 46 or 48. The flight lock message is transmitted from the message handling system 14 to the message processor 32. The flight lock message is persisted to the database 26, and rows in the table corresponding to the locked flight are locked from view. In an exemplary embodiment, the message processor 32 processes the flight lock message and secures all records pertaining to that flight from general viewing. In an exemplary embodiment, only user profiles associated with one or more application groups are able to see the events pertaining to the locked flight. In several exemplary embodiments, flight unlock commands or messages may also be transmitted.

Figure 17:
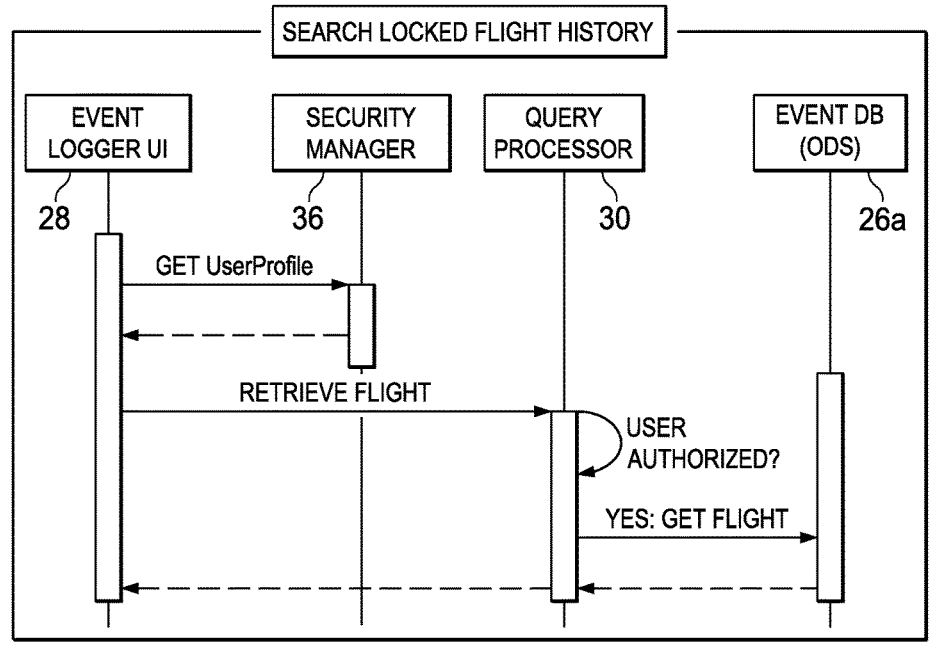
FIG. 17 is a diagrammatic illustration of a method of searching a locked flight history using the system of FIGS. 1 and 5, according to an exemplary embodiment.

In an exemplary embodiment, as illustrated in FIG. 17 with continuing reference to FIGS. 1-16, if a search request for history of a locked flight is made, the request is validated using the security manager 36. In an exemplary embodiment, at the step 90b, the security manager 36 determines privileges for the application group(s) of which a user profile associated with the request is a part. In an exemplary embodiment, the group(s) are retrieved from the LDAP directory (passed in the HTTP headers 74*a* and 74*b* shown in FIG. 6 in an exemplary embodiment). After the security manager 36 validates the request, the query processor 30 determines if the user profile associated with the request is authorized to access the locked flight. If so, the data is retrieved using the query processor 30, which obtains the data from the flight and crew ODS 26*a*. In an exemplary embodiment, the query processor 30 retrieves the data from the flight and crew ODS 26*a* via at least the read queue 78 shown in FIG. 6. In an exemplary embodiment, the query processor 30 retrieves the data from the flight and crew ODS 26*a* via at least the queue 92 shown in FIG. 5.

In several exemplary embodiments, when a user asks to view flight event history, the user's profile will include the user's group(s) that were retrieved from the LDAP directory (passed in the HTTP headers 74*a* and 74*b* shown in FIG. 6 in an exemplary embodiment). Respective privileges for each application group are determined using the security manager 36. If the flight is not locked, the query processor 30 returns all flight history events for the designated flight. If the flight is locked, the query processor checks to see if the user has the requisite viewing privileges before showing the flight history events. If the user does not have the requisite privileges to view the locked flight, the user is informed via a message displayed on the event logger GUI 28.

In several exemplary embodiments, crew event history may be locked and searched in accordance with the foregoing descriptions of FIGS. 16 and 17, respectively. In an exemplary embodiment, a user of the FOS 18 or one of the non-TPF applications 22 issues a command to issue a crew member lock message, which is posted to the message handling system 14 and passed to the event logger application 12. The message processor 30 of the event logger application 12 processes the crew member lock command and secures all records pertaining to that crew member from general viewing, persisting the event to the database 26. In several exemplary embodiments, only users belonging to one or more predetermined groups are able to see events pertaining to the locked crew member.

In an exemplary embodiment, to search for flight, crew, or other history in accordance with the method 90, 94, or 96, respectively, a user authenticates to the LDAP using the userid and password. The groups(s) of which the user profile associated with the userid and password is a part are included in the LDAP user profile. The event logger application 12 requires that the LDAP attribute be made available in the HTTP headers 74*a* and 74*b*. After providing accurate credentials, the user is forwarded to the event logger GUI 28.

In an exemplary embodiment, a user, via the system 10, can input a single query and obtain sequenced information from new and legacy applications using the single query.

In several exemplary embodiments, systems and methods according to respective exemplary embodiments make flight/crew history available from a single source and in a consistent format.

In several exemplary embodiments, systems and methods according to respective exemplary embodiments implement an application for one or more airlines capable of supporting all event logging requirements, and connect to non-TPF-based flight operations applications via a message handling system, and are compatible with existing and planned hardware and flexible to allow for expansion if required.

In several exemplary embodiments, systems and methods according to respective exemplary embodiments provide audit trail-like tracking of changes made to flight and crew information.

In several exemplary embodiments, systems and methods according to respective exemplary embodiments provide powerful search and filter capabilities, leading to quicker and more efficient decision making capabilities.

In several exemplary embodiments, systems and methods according to respective exemplary embodiments combine disparate types of flight/crew history information from various systems into one location.

In several exemplary embodiments, systems and methods according to respective exemplary embodiments bring all the history events for a single flight together. As applications migrate out of the FOS, systems and methods according to respective exemplary embodiments contain history from the remaining FOS applications yet to migrate, as well as history from the new applications (out of FOS), and time-sequence all history events for a single flight across these applications. In several exemplary embodiments, systems and methods according to respective exemplary embodiments enable users to efficiently retrieve the information they need.

In several exemplary embodiments, systems and methods according to respective exemplary embodiments also make crew history available and thus make all history available from one application.

Figure 18:
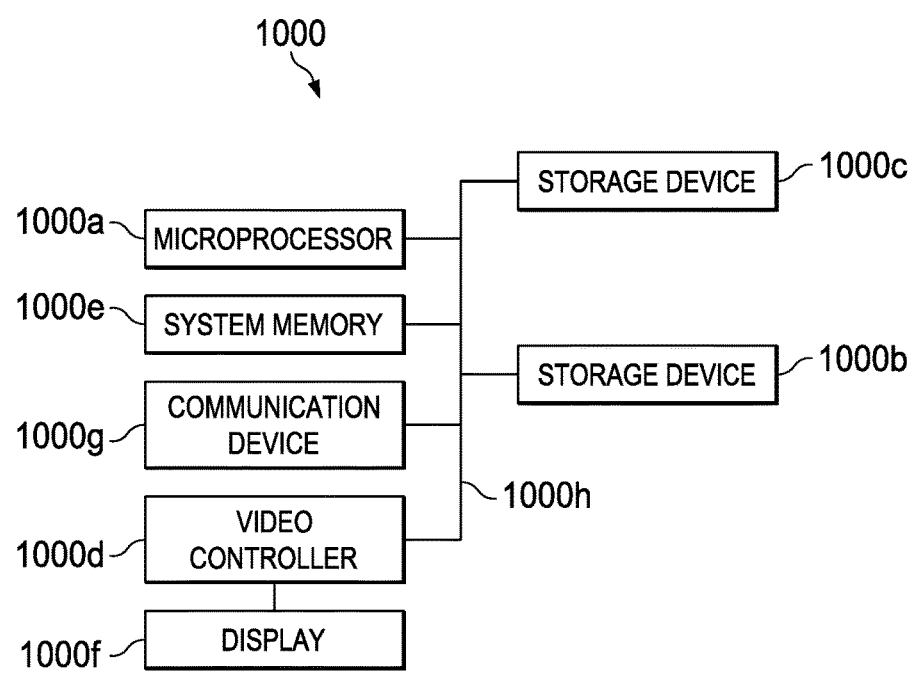
FIG. 18 is a diagrammatic illustration of a node for implementing one or more exemplary embodiments of the present disclosure, according to an exemplary embodiment.

In an exemplary embodiment, as illustrated in FIG. 18 with continuing reference to FIGS. 1-17, an illustrative node 1000 for implementing one or more of the exemplary embodiments described above, illustrated in FIGS. 1 and 2, described and/or illustrated in Appendix A, and/or any combination thereof, is depicted. The node 1000 includes a microprocessor 1000*a*, an input device 1000*b*, a storage device 1000*c*, a video controller 1000*d*, a system memory 1000*e*, a display 1000*f*, and a communication device 1000*g* all interconnected by one or more buses 1000*h*. In several exemplary embodiments, the storage device 1000*c* may include a floppy drive, hard drive, CD-ROM, optical drive, any other form of storage device and/or any combination thereof. In several exemplary embodiments, the storage device 1000*c* may include, and/or be capable of receiving, a floppy disk, CD-ROM, DVD-ROM, or any other form of computer-readable medium that may contain executable instructions. In several exemplary embodiments, the communication device 1000*g* may include a modem, network card, or any other device to enable the node to communicate with other nodes. In several exemplary embodiments, any node represents a plurality of interconnected (whether by intranet or Internet) computer systems, including without limitation, personal computers, mainframes, PDAs, smartphones and cell phones.

In several exemplary embodiments, one or more of the components of the systems described above, illustrated in FIGS. 1-17, and/or any combination thereof, include at least the node 1000 and/or components thereof, and/or one or more nodes that are substantially similar to the node 1000 and/or components thereof. In several exemplary embodiments, one or more of the above-described components of the node 1000 and/or the system 10 include respective pluralities of same components.

In several exemplary embodiments, one or more of the applications, systems, and application programs described above, illustrated in FIGS. 1-3, described and/or illustrated Appendix A, and/or any combination thereof, include a computer program that includes a plurality of instructions, data, and/or any combination thereof; an application written in, for example, Arena, HyperText Markup Language (HTML), Cascading Style Sheets (CSS), JavaScript, Extensible Markup Language (XML), asynchronous JavaScript and XML (Ajax), and/or any combination thereof; a web-based application written in, for example, Java or Adobe Flex, which in several exemplary embodiments pulls real-time information from one or more servers, automatically refreshing with latest information at a predetermined time increment; or any combination thereof.

In several exemplary embodiments, a computer system typically includes at least hardware capable of executing machine readable instructions, as well as the software for executing acts (typically machine-readable instructions) that produce a desired result. In several exemplary embodiments, a computer system may include hybrids of hardware and software, as well as computer sub-systems.

In several exemplary embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a node such as, for example, on a client machine or server.

In several exemplary embodiments, combinations of software and hardware could also be used for providing enhanced functionality and performance for certain embodiments of the present disclosure. In an exemplary embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In several exemplary embodiments, data structures are defined organizations of data that may enable an embodiment of the present disclosure. In an exemplary embodiment, a data structure may provide an organization of data, or an organization of executable code.

In several exemplary embodiments, any networks and/or one or more portions thereof may be designed to work on any specific architecture. In an exemplary embodiment, one or more portions of any networks may be executed on a single computer, local area networks, client-server networks, wide area networks, internets, hand-held and other portable and wireless devices and networks.

In several exemplary embodiments, a database may be any standard or proprietary database software. In several exemplary embodiments, the database may have fields, records, data, and other database elements that may be associated through database specific software. In several exemplary embodiments, data may be mapped. In several exemplary embodiments, mapping is the process of associating one data entry with another data entry. In an exemplary embodiment, the data contained in the location of a character file can be mapped to a field in a second table. In several exemplary embodiments, the physical location of the database is not limiting, and the database may be distributed. In an exemplary embodiment, the database may exist remotely from the server, and run on a separate platform. In an exemplary embodiment, the database may be accessible across the Internet. In several exemplary embodiments, more than one database may be implemented.

In several exemplary embodiments, a plurality of instructions stored on a computer readable medium may be executed by one or more processors to cause the one or more processors to carry out or implement in whole or in part the above-described operation of each of the above-described exemplary embodiments of the system, the method, and/or any combination thereof. In several exemplary embodiments, such a processor may include one or more of the microprocessor 1000a, any processor(s) that are part of the components of the system, and/or any combination thereof, and such a computer readable medium may be distributed among one or more components of the system. In several exemplary embodiments, such a processor may execute the plurality of instructions in connection with a virtual computer system. In several exemplary embodiments, such a plurality of instructions may communicate directly with the one or more processors, and/or may interact with one or more operating systems, middleware, firmware, other applications, and/or any combination thereof, to cause the one or more processors to execute the instructions.

The present disclosure introduces an event logging and searching system that includes a message handling system adapted to receive and transform an event message so that the event message conforms to a standard schema regardless of whether the event message is generated using a TPF application or a non-TPF application, wherein the event message describes either an airline flight history event or an airline crew history event; a message processor in communication with the message handling system, wherein the message processor is adapted to receive the event message from the message handling system and parse the event message; a database, which is in communication with the message processor and to which history data of the event message is persisted for storage therein; a query processor in communication with the database and adapted to read airline flight or crew history event data therefrom in response to a query request, the query request including a plurality of search parameters, the airline flight or crew history event data including the history data of the event message; and a graphical user interface to generate the query request and present the airline flight or crew event history data read from the database in accordance with the search parameters. In an exemplary embodiment, the standard schema to which the event message is conformed is a standard XML schema. In an exemplary embodiment, the event logging and searching system includes a first protected message queue via which the message handling system is adapted to receive the event message when the event message describes the airline flight history event; and a second protected message queue via which the message handling system is adapted to receive the event message when the event message describes the airline crew history event. In an exemplary embodiment, the event logging and searching system includes a first machine of which at least a portion of the message processor is a part;

a first read queue via which the message handling system is adapted to transmit the event message to the message processor when the event message describes the airline flight history event; and a second read queue via which the message handling system is adapted to transmit the event message to the message processor when the event message describes the airline crew history event; wherein the message processor includes a first message-driven bean in communication with the first queue, and a second message-driven bean in communication with the second queue; and wherein the first and second message-driven beans are part of the first machine. In an exemplary embodiment, the event logging and searching system includes an event logger persistence component, the event logger persistence component including a first session bean in communication with each of the first and second message-driven beans of the message processor; and a first write queue via which the first session bean is in communication with the database. In an exemplary embodiment, the event logging and searching system includes a second machine of which another portion of the message processor is a part; a third read queue via which the message handling system is adapted to transmit another event message to the message processor when the other event message describes another airline flight history event; and a fourth read queue via which the message handling system is adapted to transmit the other event message to the message processor when the other event message describes another airline crew history event; wherein the message processor includes a third message-driven bean in communication with the third queue, and a fourth message-driven bean in communication with the fourth queue; and wherein the third and fourth message-driven beans are part of the second machine. In an exemplary embodiment, the event logger persistence component further includes a second session bean in communication with each of the third and fourth message-driven beans of the message processor; and the event logging and searching system further includes a second write queue via which the second session bean is in communication with the database. In an exemplary embodiment, the database includes a flight table into which the history data of the event message is persisted when the event message describes the airline flight history event; and a crew table into which the history data of the event message is persisted when the event message describes the crew history event.

The present disclosure also introduces a method of logging airline history events to facilitate subsequent searching of data associated therewith, the method including transmitting an event record from a message handling system to an event logger application, wherein the message handling system includes a first node, the first node including one or more first processors and a first computer readable medium operably coupled thereto; wherein the event logger application includes a second node, the second node including one or more second processors and a second computer readable medium operably coupled thereto; and wherein the event record has an event type and includes one or more data elements; validating, using the event logger application, the event type of the event record; reading, using the event logger application, the one or more data elements of the event record; and storing the event record using the event logger application; wherein the event type is either an airline flight event or an airline crew event, wherein a code is assigned to each of the one or more data elements, each of the codes identifying either a type of airline flight event or a type of airline crew event, and wherein the event record transmitted from the message handling system to the event logger application conforms to a standard schema regardless of whether the event message is generated using a TPF application or a non-TPF application. In an exemplary embodiment, the method includes transforming, using the message handling system, the event record so that the event record conforms to the standard schema regardless of whether the event message is generated using the TPF application or the non-TPF application; wherein the event record is transformed after transmitting the event record from the external application to the message handling system but before transmitting the event record from the message handling system to the event logger application. In an exemplary embodiment, the standard schema to which the event record is conformed is a standard XML schema. In an exemplary embodiment, the method includes generating the event record using the external application; and transmitting the event record from the external application to the message handling system; wherein the event record is transmitted from the external application to the message handling system via a first protected message queue when the event type is an airline flight event; and wherein the event record is transmitted from the external application to the message handling system via a second protected message queue when the event type is a crew flight event. In an exemplary embodiment, the standard schema to which the event record is conformed is a standard XML schema; reading the one or more data elements of the event record includes parsing XML of the event record; and storing the event record includes persisting history data of the event record from the event logger application to a database for storage therein. In an exemplary embodiment, storing the event record includes persisting history data of the event record from the event logger application to a database for storage therein; and persisting the history data of the event record from the event logger application to the database for storage therein includes: persisting the history data into a flight table when the event type is an airline flight event; and persisting the history data into a crew table when the event type is a crew flight event.

The present disclosure also introduces an apparatus for logging airline history events to facilitate subsequent searching of data associated therewith, the apparatus including a first non-transitory computer readable medium; and a first plurality of instructions stored on the first non-transitory computer readable medium and executable by one or more first processors, the plurality of instructions including: instructions that cause the one or more first processors to receive an event record from a message handling system, wherein the message handling system includes one or more second processors and a second non-transitory computer readable medium operably coupled thereto, wherein the event record has an event type and includes one or more data elements, and wherein the event type is either an airline flight event or an airline crew event; instructions that cause the one or more first processors to validate the event type of the event record; instructions that cause the one or more first processors to read the one or more data elements of the event record; and instructions that cause the one or more first processors to store the event record; wherein a code is assigned to each of the one or more data elements, each of the codes identifying either a type of airline flight event or a type of airline crew event; and wherein the event record received from the message handling system conforms to a standard schema regardless of whether the event record is generated using a TPF application or a non-TPF application. In an exemplary embodiment, the apparatus includes the message handling system, wherein the message handling system further includes a second plurality of instructions stored on the second non-transitory computer readable medium and executable by the one or more second processors; wherein the second plurality of instructions includes instructions that cause the one or more second processors to transform the event record so that the event record conforms to the standard schema regardless of whether the event message is generated using the TPF application or the non-TPF application. In an exemplary embodiment, the standard schema to which the event record is conformed is a standard XML schema. In an exemplary embodiment, the second plurality of instructions includes instructions that cause the one or more second processors to receive the event record from the external application; and the apparatus further includes: a first protected message queue via which the event record is transmitted from the external application to the message handling system when the event type is an airline flight event; and a second protected message queue via which the event record is transmitted from the external application to the message handling system when the event type is a crew flight event. In an exemplary embodiment, the standard schema to which the event record is conformed is a standard XML schema; the instructions that cause the one or more first processors to read the one or more data elements of the event record include instructions that cause the one or more first processors to parse XML of the event record; and the instructions that cause the one or more first processors to store the event record include instructions that cause the one or more processors to persist history data of the event record to a database for storage therein. In an exemplary embodiment, the instructions that cause the one or more first processors to store the event record include instructions that cause the one or more first processors to persist history data to a database for storage therein; and the instructions that cause the one or more first processors to persist the history data of the event record to the database for storage therein include: instructions that cause the one or more first processors to persist the history data into a flight table when the event type is an airline flight event; and instructions that cause the one or more first processors to persist the history data into a crew table when the event type is a crew flight event.

It is understood that variations may be made in the foregoing without departing from the scope of the present disclosure. For example, instead of, or in addition to transportation transactions often conducted in the course of airline industry business, aspects of the present disclosure are applicable and/or readily adaptable to transportation transactions conducted in other industries, including rail, bus, cruise and other travel or shipping industries, rental car industries, hotels and other hospitality industries, entertainment industries, and other industries. In an exemplary embodiment, aspects of the present disclosure are readily applicable and/or readily adaptable to a shipping travel leg in which a ship travels from one port to one or more other ports. In an exemplary embodiment, aspects of the present disclosure are readily applicable and/or readily adaptable to a trucking travel leg during which a truck travels from one city to one or more other cities. In an exemplary embodiment, aspects of the present disclosure are readily applicable and/or readily adaptable to a rail travel leg during which a train travels from one city or station to one or more other cities or stations. In an exemplary embodiment, aspects of the present disclosure are applicable and/or readily adaptable to a wide variety of transportation transactions such as, for example, an airline sequence or itinerary (i.e., a plurality of airline flights), a travel leg of an airline sequence or itinerary (i.e., a single airline flight), an airline block, and/or any combination thereof.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

What is claimed is:

1. A method of interacting with a data center to log airline history events from multiple locations and types of sources to facilitate subsequent multiple and simultaneous secure searches of data associated with the airline history events, the method comprising:
generating a plurality of first event records using a Transaction Processing Facility ("TPF") application,
wherein each of the first event records has an event type and comprises one or more data elements,
wherein the event type of the each first event record is either an airline flight event or an airline crew event, and wherein a code is assigned to each of the one or more data elements of the each first event record, each of the codes identifying either a type of airline flight event or a type of airline crew event;

transmitting each of the first event records from the TPF application to a message handling system;

transforming, using the message handling system, each of the first event records so that each of the first event records conforms to a standard Extensible Markup Language ("XML") schema;

transmitting each of the first event records from the message handling system to an event logger application;

storing, in a database in communication with the event logger application, each of the first event records, wherein each of the first event records, as transmitted from the message handling system to the event logger application, conforms to the standard XML schema;

generating a plurality of second event records using a non-TPF application, wherein the second event records are generated independently of the first event records and thus the second event records are not based on the first event records;

wherein each of the second event records has an event type and comprises one or more data elements, wherein the event type of the each second event record is either an airline flight event or an airline crew event, and wherein a code is assigned to each of the one or more data elements of the each second event record, each of the codes identifying either a type of airline flight event or a type of airline crew event;

transmitting each of the second event records from the non-TPF application to the message handling system;

transforming, using the message handling system, each of the second event records so that each of the second event record conforms to the same standard XML schema as the standard XML schema to which each of the first event records is conformed;

transmitting each of the second event records from the message handling system to the event logger application; and storing, in the database, each of the second event records, wherein each of the second event records, as transmitted from the message handling system to the event logger application, conforms to the same standard XML schema as the standard XML schema to which each of the first event records is conformed, and thus each of the first and second event records transmitted from the message handling system to the event logger application conforms to the same standard XML schema notwithstanding that: each of the first event records is generated using the TPF application, and each of the second event records is generated using the non-TPF application and the generation of the second event records is independent of the generation of the first event records and thus the second event records are not based on the first event records;

load balancing, using one or more traffic manager ("TM") devices associated with the data center, respective query requests by users, wherein the respective query requests by the users are load balanced by the one or more TM devices;

validating a first query request of the load-balanced respective query requests;

retrieving airline flight history data from the database, wherein the airline flight history data is retrieved in response to the first query request of the load-balanced respective query requests; and presenting, using a graphical user interface ("GUI") of the event logger application, the airline flight history data in accordance with search parameters of the first query request;

wherein the message handling system comprises:
first and second read queues at a first location; and
third and fourth read queues at a second location.

2. The method of claim 1, wherein at least one of the first event records is transmitted to the event logger application via the second read queue at the first location; and wherein at least one other of the first event records is transmitted to the event logger application via the fourth read queue at the second location.

3. The method of claim 2, wherein the event logger application comprises a first message-driven bean ("MDB"), a second MDB, a third MDB, and a fourth MDB;

and wherein the method further comprises:
reading, using the first MDB, the one or more data elements of the at least one of the first event records; and
reading, using the second MDB, the one or more data elements of the at least one other of the first event records.

4. The method of claim 3, wherein storing, in the database in communication with the event logger application, each of the first event records comprises:

storing, in the database via a first write queue, the at least one of the first event records using a first session bean, which is in communication with the first MDB and which is in communication with the database via the first write queue; and storing, in the database via a second write queue, the at least one other of the first event records using a second session bean, which is in communication with the second MDB and which is in communication with the database via the second write queue.

5. The method of claim 4, wherein at least one of the second event records is transmitted to the event logger application via the first read queue at the first location;

wherein at least one other of the second event records is transmitted to the event logger application via the third read queue at the second location;

wherein the method further comprises:
reading, using the third MDB, the one or more data elements of at least one of the second event records;
reading, using the fourth MDB, the one or more data elements of the least one other of the second event records;
storing, in the database via the first write queue, the at least one of the second event records using the first session bean, which is in communication with the third MDB; and
storing, in the database via the second write queue, the at least one other of the second event records using the second session bean, which is in communication with the fourth MDB.

6. A system for logging airline history events from multiple locations and types of sources to facilitate subsequent multiple and simultaneous secure searches of data associated with the airline history events, the system comprising:
a data center including a database;
one or more traffic manager ("TM") devices, wherein at least one of the one or more TM devices is located within the data center;

first and second read queues at a first location, and third and fourth read queues at a second location, wherein the second location is different from, and is remotely located from, the first location, and wherein neither the first location nor the second location is within the data center;

a first session bean in communication with the database via a first write queue;

first and second message-driven beans ("MDBs"), each of which is in communication with the first session bean;

a second session bean in communication with the database via a second write queue;

third and fourth MDBs, each of which is communication with the second session bean;

a first machine of which the first session bean, and the first and third MDBs, are a part, wherein the first machine is in communication with the one or more TM devices, and wherein the first machine is in communication with the database via a fifth read queue; and a second machine of which the second session bean, and the second and fourth MDBs, are a part, wherein the second machine is in communication with the one or more TM devices, and wherein the second machine is in communication with the database via the fifth read queue;

wherein the one or more TM devices load balance respective query requests by users, wherein the respective query requests by the users are load balanced between at least the first and second machines by the one or more TM devices; and wherein each of the first and second machines further comprises:

a plugin from which a Hypertext Transfer Protocol ("HTTP") header is adapted to be forwarded; and a graphical user interface ("GUI") to which the HTTP header is adapted to be forwarded from the plugin.

7. The system of claim 6, wherein each of the first and second machines further comprises:

a query processor in communication with the database via the fifth read queue, wherein the query processor is adapted to read airline flight or crew history data from the database in response to a query request by a user, the query request comprising a plurality of search parameters;

wherein the GUI is adapted to generate the query request and present to the user the airline flight or crew event history data read from the database in accordance with the search parameters.

8. The system of claim 7, wherein a user profile is associated with the query request by the user, and wherein the user profile is a part of application group(s) adapted to be retrieved from a lightweight directory access protocol ("LDAP") directory.

9. The system of claim 7, wherein a user profile is associated with the query request by the user, and wherein the user profile is a part of application group(s) adapted to be passed in the HTTP header from the plugin to determine privilege(s) for the application group(s) of which the user profile is a part.

10. The system of claim 7, wherein a user profile is associated with the query request by the user, and wherein the user profile is a part of application group(s) adapted to be retrieved from a lightweight directory access protocol ("LDAP") directory and passed in the HTTP header from the plugin to determine privilege(s) for the application group(s) of which the user profile is a part.

11. A system, comprising:

a data center including a database;

one or more traffic manager ("TM") devices associated with the data center;

a first session bean in communication with the database via a first write queue;

first and second message-driven beans ("MDBs"), each of which is in communication with the first session bean;

a second session bean in communication with the database via a second write queue;

third and fourth MDBs, each of which is communication with the second session bean;

a first machine of which the first session bean, and the first and third MDBs, are a part, wherein the first machine is in communication with the one or more TM devices, and wherein the first machine is in communication with the database via a fifth read queue; and a second machine of which the second session bean, and the second and fourth MDBs, are a part, wherein the second machine is in communication with the one or more TM devices, and wherein the second machine is in communication with the database via the fifth read queue;

wherein the one or more TM devices load balance respective query requests by users, wherein the respective query requests by the users are load balanced between at least the first and second machines by the one or more TM devices; and wherein each of the first and second machines further comprises:

a query processor in communication with the database via the fifth read queue, wherein the query processor is adapted to read airline flight or crew history data from the database in response to a query request by a user, the query request comprising a plurality of search parameters;

and wherein each of the first and second machines further comprises:

a plugin from which a Hypertext Transfer Protocol ("HTTP") header is adapted to be forwarded; and a graphical user interface ("GUI") to which the HTTP header is adapted to be forwarded from the plugin, via which the query request by the user is adapted to be generated, and via which the airline flight or crew event history data read from the database is adapted to be presented to the user.

12. The system of claim 11, wherein a user profile is associated with the query request by the user; and wherein the user profile is a part of application group(s) adapted to be:

retrieved from a lightweight directory access protocol ("LDAP") directory; and/or passed in the HTTP header from the plugin to determine privilege(s) for the application group(s) of which the user profile is a part.

* * * * *